(12) United States Patent
Veldkamp (10) Patent No.: US 6,626,642 B1
(45) Date of Patent: Sep. 30, 2003

(54) WIND TURBINE BLADE WITH U-SHAPED OSCILLATION DAMPING MEANS

(75) Inventor: Herman F. Veldkamp, Houten (NL)

(73) Assignee: NEG Micon A/S, Randers (DK)

( * ) Notice: Subject to any disclaimer, the term of this patent is extended or adjusted under 35 U.S.C. 154(b) by 0 days.

(21) Appl. No.: 09/744,560

(22) PCT Filed: Jul. 28, 1999

(86) PCT No.: PCT/DK99/00423

§ 371 (c)(1),
(2), (4) Date: Jul. 18, 2001

(87) PCT Pub. No.: WO00/06898

PCT Pub. Date: Feb. 10, 2000

(30) Foreign Application Priority Data

| Jul. 28, 1998 | (DK) | 1998 00275 U |
| Jul. 28, 1998 | (DK) | 1998 00276 U |
| Jul. 28, 1998 | (DK) | 1998 00274 U |

(51) Int. Cl.$^7$ ................................................ F03D 1/06
(52) U.S. Cl. ........................................................ 416/79
(58) Field of Search .............................. 416/80, 81, 82, 416/79, 500

(56) References Cited

U.S. PATENT DOCUMENTS

| 1,398,062 A | * | 11/1921 | Brooks ..................... 416/223 |
| 1,442,217 A |  | 1/1923 | H'Doubler |
| 2,349,187 A | * | 5/1944 | Meyer ....................... 416/500 |
| 3,887,296 A | * | 6/1975 | Mills et al. ................ 416/500 |
| 4,239,456 A | * | 12/1980 | Joglekar et al. ........... 416/500 |
| 4,460,314 A | * | 7/1984 | Fuller ........................ 416/500 |
| 4,527,951 A | * | 7/1985 | Trier .......................... 416/500 |

FOREIGN PATENT DOCUMENTS

| DK | 9500222 U3 | 9/1996 |
| DK | 172039 B1 | 9/1997 |
| EP | 0853197 | 7/1998 |
| GB | 090339 | 7/1992 |
| WO | 9521327 | 8/1995 |
| WO | 9932789 | 7/1999 |

OTHER PUBLICATIONS

Kagawa et al., Asme Pressure Vessels and Piping Div. Proc. 1194 Conference, vol. 289, Nos. 6–9, pp. 41–8 (1999).
Gao et al., Engineering Structures, vol. 19, No. 6, pp. 476–486 (1997).

* cited by examiner

Primary Examiner—Edward K. Look
Assistant Examiner—Igor Kershteyn
(74) Attorney, Agent, or Firm—Birch, Stewart, Kolasch & Birch, LLP (57) ABSTRACT

A wind turbine blade has an oscillation damper provided in the blade for damping oscillations of the blade, in particular edgewise oscillations of the blade in the rotational plane of a rotor on which the blade is mounted. The damper comprises a U-shaped cavity in which a saturated solution of sodium chloride in water may oscillate in counter-phase with the oscillations of the blade. The upper end of the arms of the U-shaped cavity are connected with a passage way so that an O-shaped cavity is provided. The cavity may be tuned to dampen oscillations of the first natural edgewise frequency or the second natural edgewise frequency of the blade or the damper may comprise both types of dampers. Furthermore, blades comprising dampers having a cylindrical element may roll in a box in the blade and dampers can have a resiliently suspended pendulum.

64 Claims, 5 Drawing Sheets

WIND TURBINE BLADE WITH U-SHAPED OSCILLATION DAMPING MEANS

This application is the national phase under 35 U.S.C. §371 of PCT International Application No. PCT/DK99/00423 which has an International filing date of Jul. 28, 1999, which designated the United States of America.

The present invention relates to wind turbine blades with oscillation damping means provided in the blade for damping oscillations of the blade, in particular edgewise oscillations of the blade in the rotational plane of a rotor on which the blade is mounted.

The invention relates in particular to damping means comprising a U-shaped cavity in which a liquid, preferably a saturated solution of sodium chloride in water, may oscillate in counter-phase with the oscillations of the blade. The upper end of the arms of the U-shaped cavity are in an advantageous embodiment connected with a passage way so that an O-shaped cavity is provided. The cavity may be tuned to dampen oscillations of the first natural edgewise frequency or the second natural edgewise frequency of the blade or the damping means may comprise both types of dampers.

Furthermore, the invention relates to blades comprising dampers having a cylindrical element that may roll in a box in the blade and to dampers having a resiliently suspended pendulum.

BACKGROUND

Undesired oscillations may occur in wind turbines for power generation. These oscillations may include the entire turbine, i.e. several parts are oscillating in a combined mode, or the oscillations may occur locally in single part. Of particular severity are oscillations in the rotor blades either edgewise (in the rotor plane), flapwise (perpendicular to the rotor plane), or in a combined edge-and flapwise mode. Whether these oscillations do occur is dependent on the wind turbine design and the meteorological conditions.

The oscillation phenomena may cause dangerously high loads on the blade and other parts of the wind turbine, which may lead to a sudden collapse or alternatively may be the cause of fatigue damage and lifetime reduction, as cracks in the components slowly grow ultimately leading to failure. The occurrence of oscillations adds an uncertainty factor to predictions of lifetime loads on the various parts of a wind turbine, making it necessary to make the design stronger and heavier than would otherwise be the case.

The concept of damping of oscillations in blade arranged on a rotor has been known for many years from turbine blades as described in U.S. Pat. No. 2,292,072, U.S. Pat. No. 2,349,187 and U.S. Pat. No. 2,999,669.

The general principle of dampen oscillations of wind turbine blades by building a damping device into the blades is described in WO-A-95/21327, and a number of examples of such devices are given, such as devices having a movable mass, a spring and a damper combined in different configurations, an electromagnetic device comprising a suspended aluminium disk in which eddy currents are induced during movement of the disk to provide resistance to movement and a device comprising a container partly filled with a liquid and having a perforated damper plate, a Tuned Liquid Damper (TLD).

A damping device comprising a number of cavities, mainly spherical cavities, filled with granulate or a liquid, is disclosed in DK 95 00222 U3, and a damping device comprising a number of containers partly filled with liquid, a Tuned Liquid Damper system (TLD), is disclosed in WO 99/32789.

A general problem is that it is difficult to produce an efficient damper of a feasible design that is sufficiently compact and flat in order to satisfy the severe spatial restrictions within the blade.

A wind turbine blade having a mechanical resonator comprising two coupled pendulums is disclosed in EP 0 853 197 A1. A compact design of the damper may be provided but the coupling mechanisms are mechanically rather complex.

DESCRIPTION OF THE INVENTION

Damping of oscillations in wind turbine blades, in particular edgewise oscillations, is important for preventing fatigue damages and failure of the blades, and the issue is becoming increasingly important with the development of larger wind turbines and a more light construction of the blades.

It is an object of the present invention to provide a wind turbine blade having an efficient damper of a feasible design that is sufficiently compact and flat in order to satisfy the severe spatial restrictions within the blade.

It is a further object of the present invention to provide a blade having a damper that is of a simple construction in order to reduce the costs of the damper and at the same time provide a damper that requires no or very little maintenance during its expected lifetime.

As the design of the construction of wind turbine blades becomes more light and the blades are made longer, an increasing demand arises for damping of oscillations of the second natural frequency of the blade, in particular oscillations of the second natural frequency of the blade in the rotational plane of the rotor, i.e. second order edgewise oscillations. It is a still further object of the present invention to provide a blade having a damper for damping oscillations of the second natural frequency of the blade, in particular edgewise oscillations.

It is a yet still further object of the present invention to provide a blade having means for damping oscillations of the second natural frequency as well as means for damping oscillations of the first natural frequency.

Thus, the present invention relates to a wind turbine blade for being arranged on a rotor of a wind turbine, the blade comprising oscillation damping means defining a U-shaped cavity within the blade, the cavity being partly filled with a liquid, of which cavity the bottom of the U-shape is arranged towards a tip end of the blade and the arms of the U-shape are oriented substantially toward a hub end of the blade.

The cavity may typically be defined by means of a tube or a shell, but the cavity may also be an integrated part of the construction elements of the blade. The hub end of the blade is understood to be the end connected to the hub of the rotor and the tip end is understood to be the free end of the blade. The U-shape should be understood in a broad sense as a cavity having a middle or bottom part and two arms, that preferably are arranged symmetrically with respect to the bottom part so that oscillations are dampened symmetrically. The bottom part may be quite short as compared to the liquid filled part of the arms so that the shape is more like a V which may be advantageous because the natural frequency of a damper of such design varies less at high amplitudes of the liquid column inside the cavity than for a damper having a longer bottom part. However, a feasible design has shown to be more U-shaped than V-shaped and a design in which the length of the liquid column contained within the bottom part is approximately equal to twice the length of the liquid column of each of the arms provides satisfactory damping properties of the damper as well as relatively small amplitudes of the liquid column.

The arms of the cavity are in a particular embodiment arranged in a rotational plane of the rotor and the oscillation damping means is tuned to dampen oscillations of the first natural frequency of the blade in the rotational plane so that edgewise oscillations of the blade are dampened. These oscillations are mainly within the range of 1–5 Hz to which frequency range the oscillation damping means preferably is tuned.

In order to provide a proper damping of the blade, the oscillation damping means should be designed to dampen the oscillations of the first natural frequency of the blade in the rotational plane with a magnitude equivalent to a logarithmic decrement of the amplitude of at least 2%.

The logarithmic decrement $\delta$ of the amplitude is defined as $$\delta = \frac{1}{n} \ln\left(\frac{a_1}{a_n}\right)$$

where n is the number of oscillations
$a_1$ is the amplitude of the first oscillation, and
$a_n$ is the amplitude of the nth oscillation.

The structure of the blade has in itself a damping effect in the oscillations, and the oscillations of the first natural frequency of the blade in the rotational plane should totally dampen with the combined effect of the structure and the damper with a magnitude equivalent to a logarithmic decrement of the amplitude of at least 5% and preferably within the range of 6–15% in order to prevent excessive load on the blade from edgewise oscillations.

The mass of the liquid being movable in the direction of the oscillations is in advantageous embodiments of the present invention equivalent to 0.5% to 2% of the equivalent oscillating mass of the blade in the first natural oscillating mode at the radial position of the damping means. The equivalent oscillating mass is commonly found as a mass positioned at the tip of a blade of no mass and this mass is converted to an equivalent oscillating mass of another radial position by multiplying the mass with the ratio between the amplitudes of an oscillation at the tip and at the radial position.

The upper end of the arms of the U-shaped cavity should be designed so that it is avoided that a potion of air is captured between the surface of the liquid and the inner wall of the arm in a manner so the portion of air acts as a spring, since the presence of such springs has proven to be disadvantageous. The damper may be designed with long arms or the arms may be connected to a reservoir or to the atmosphere. However, long arm or a reservoir is space consuming and is therefore not ideal for a damper to be build into a blade and an opening to the atmosphere causes vapour of the liquid to leave the cavity, thus reducing the amount of liquid and changing the natural frequency of the damper over time unless means for adjusting the amount of liquid in the damper is provided for. The most advantageous design is when a passage way is defined at the upper end of the U-shaped cavity, the passage way connecting the two arms so that an O-shaped cavity is provided.

The passage way is preferably designed so that the air may pass back and forth with only a low resistance, since the damper counteracts the oscillations of the blade by being in counter-phase with these oscillations and not by dampening its own oscillations. For this reason it is preferred that the average cross-sectional area of the passage way is equal to at least half of the average cross-sectional area of the U-shaped cavity and more preferred that the average cross-sectional area of the passage way is substantially the same as the average cross-sectional area of the U-shaped cavity. An embodiment of the damper of the present invention in which the cross-sectional area is of a substantially constant magnitude throughout the O-shape has proven to posses excellent properties for the purpose.

In order to make the wind turbine fit to meet environmental changes and be operational under most circumstances, the freezing temperature of the liquid should be below −10 degrees Celsius, preferably below −18 degrees Celsius.

The density of the liquid is advantageously at least 1.1 metric ton per cubic meter, preferably at least 1.15 metric ton per cubic meter so that the physical size of the oscillation damping means may be reduced as compared to the use of pure water as a liquid.

An inexpensive liquid that is preferred for the oscillating mass is water, preferably comprising at least one agent for lowering the freezing temperature of the water and/or at least one agent for increasing the density of the liquid. Mercury or other liquid metal can also be used with the advantage that the high density allows for a very compact design of the damper, but water is still advantageous because it does not present an environmental hazard if it leaks from the containers.

A number of different agents may be employed, among these a number of salts. A preferred agent is sodium chloride because it is environmentally harmless and because the solubility of sodium chloride in water hardly changes with the temperature so that crystallisation will not occur in the container. Sodium chloride both lowers the freezing temperature of the water and increases the density.

The water may comprise at least 18 mass percentage of sodium chloride, preferably at least 22 mass percentage of sodium chloride and most preferred about 26 mass percentage of sodium chloride which is a saturated solution.

Another suitable agent for both purposes is glycerol.

Likewise and according to the present invention, the arms of the cavity may be arranged in a rotational plane of the rotor and the oscillation damping means be tuned to dampen oscillations of the second natural frequency of the blade in the rotational plane. Such damping means are preferably tuned to dampen oscillations of a frequency being within the range of 5–12 Hz, and the oscillation damping means are preferably, likewise for oscillations of the first natural frequency, designed to dampen the oscillations of the second natural frequency of the blade in the rotational plane with a magnitude equivalent to a logarithmic decrement of the amplitude of at least 2%.

The total damping of oscillations of the second natural frequency of the blade in the rotational plane is preferably of a magnitude equivalent to a logarithmic decrement of the amplitude of at least 5%, most preferred within the range of 6–15%. The mass of the liquid being movable in the direction of the oscillations is preferably equivalent to 0.5% to 2% of the equivalent oscillating mass of the blade in the second natural oscillating mode at the radial position of the damping means.

It is understood that a blade having means for damping oscillations of the first natural frequency as well as means for damping oscillations of the second natural frequency also is according to the present invention.

It is advantageous for all the above mentioned blades that the oscillation damping means are arranged in a portion of the blade having large amplitudes of the oscillating movement which for means for damping oscillations of the first natural frequency as well as for means for damping oscillations of the second natural frequency is a position in a tip end part of the blade. The oscillations of the second natural frequency will have a nodal point near the tip end part of the blade and a region between the hub end and the nodal point at which the amplitudes of oscillations of the second natural frequency are large and a damper may be positioned.

Another embodiment according to the invention of a blade with a damper is a wind turbine blade for being arranged on a rotor of a wind turbine, the blade comprising oscillation damping means having a box and a cylindrical element that engages with one side wall of the box, said side wall being arranged towards a tip end of the blade and curving towards a hub end of the blade so that the cylindrical element may roll from one side to another side of said side wall about a neutral position.

Such a damper may be given a narrow design so that is fits into a blade. The cylindrical element will at the occurrence of oscillations start to roll back and forth in counter-phase with the oscillations of the blade and thus dampen the oscillations.

The damper is preferably oriented so that the cylindrical element may roll in a rotational plane of the rotor and the oscillation damping means is tuned to dampen oscillations of the first natural frequency of the blade in the rotational plane.

The box may be at least partly filled with a liquid so as to dampen the movements of the cylindrical element and to tune the natural frequency of the damper. The liquid may be water with an agent as described previously but an lubricating oil may also be advantageous in order to diminish the wear on the engaging parts of the cylindrical element and the box.

The cylindrical element and the side wall may in a particularly preferred embodiment comprise mutually engaging elements so as to ensure that the periphery of the cylindrical element does not slip on the side wall when the element rolls. Thereby, the movement of the cylindrical element as it rolls and thus the natural frequency of the damper and the damping effect is fully predictable and will not change due to slip. The engaging elements may e.g. be a toothed wheel and a toothed rim or a sprocket wheel and a chain.

A further embodiment according to the invention of a blade having a damper is a wind turbine blade for being arranged on a rotor of a wind turbine, the blade comprising oscillation damping means having a pendulum with a mass element which may swing about a pivot axis, the pendulum being connected to the blade at the pivot axis with a resilient material so that energy is absorbed in the material when the pendulum swings.

Such a damper may be given a narrow design so that is fits into a blade and the pendulum will start to oscillate in counter-phase with the blade if oscillations of the blade occurs. The oscillations of the blade are dampened by the counter-phase oscillations of the pendulum and the movement of the pendulum is dampened by the resilient material by absorption of kinetic energy in the resilient material.

The damper is preferably oriented so that the pendulum may swing in a rotational plane of the rotor and the oscillation damping means is tuned to dampen oscillations of the first natural frequency of the blade in the rotational plane.

According to one embodiment, the mass element of the pendulum is arranged closer to a tip end of the blade than the pivot axis.

According to another embodiment of the invention, the mass element is arranged closer to a hub end of the blade than the pivot axis.

The resilient material comprises rubber in a preferred embodiment of the invention.

The mass element of the pendulum is preferably equipped with a wheel member for engaging with side wall parts of a cavity defined within the blade so as to support the mass element in the direction of the pivot axis, the wheel member being arranged about an axis being perpendicular to the pivot axis.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The description is accompanied by drawings which are given by way of illustration only, and thus are not limitative of the present invention, and in which embodiments of the present invention are described.

DETAILED DESCRIPTION OF THE INVENTION

The U-shaped damper primarily dampens the oscillations by being in counter-phase with the blade, so that the motion of the liquid inside the damper is in the opposite direction of the oscillating movement of the blade as seen in a system rotating with the angular speed of the rotor. The first natural frequency f, being also the damping frequency, of a U-shaped damper is theoretically found as $$f = \frac{1}{2\pi}\sqrt{\frac{2\Omega^2 R \sin\varphi}{L}}$$

where f is the damping frequency of the U-shaped damper [Hz], $\Omega$ is the rotational speed of the rotor [rad/s], R is the distance from the centre of the rotor to the free surface of the liquid in the damper when in neutral position [m], $\varphi$ is the angle between the direction of the legs of the U-shaped damper and the instantaneous direction of movement of the blade, and L is the length of the liquid column inside the damper along the centre of gravity of cross-sections of the column [m].

The damper is subjected to an average apparent gravity of $\Omega^2 R$ due to the rotation of the blade. The apparent gravity will due to the upright position of the rotor vary with ±9.8 m/s² during one rotation of the rotor.

An example of a blade is a 32 meter long blade with a damper placed at R=29.5 m, a rotational speed of $\Omega$=1.807 rad/s and a first natural frequency in the rotational plane of the blade, an edgewise natural frequency, $f_b$, of 2.19 Hz and the legs of the damper are parallel to the longitudinal axis of the blade so that $\phi=\pi/2$. Thus, the length L of the liquid column found from the above equation is 1.017 m.

By varying the apparent gravity with ±9.8 m/s² it is found for the present blade that the natural frequency of the damper varies ±0.13 Hz during a rotation which is equal to ±6% of the average natural frequency.

Figure 3:
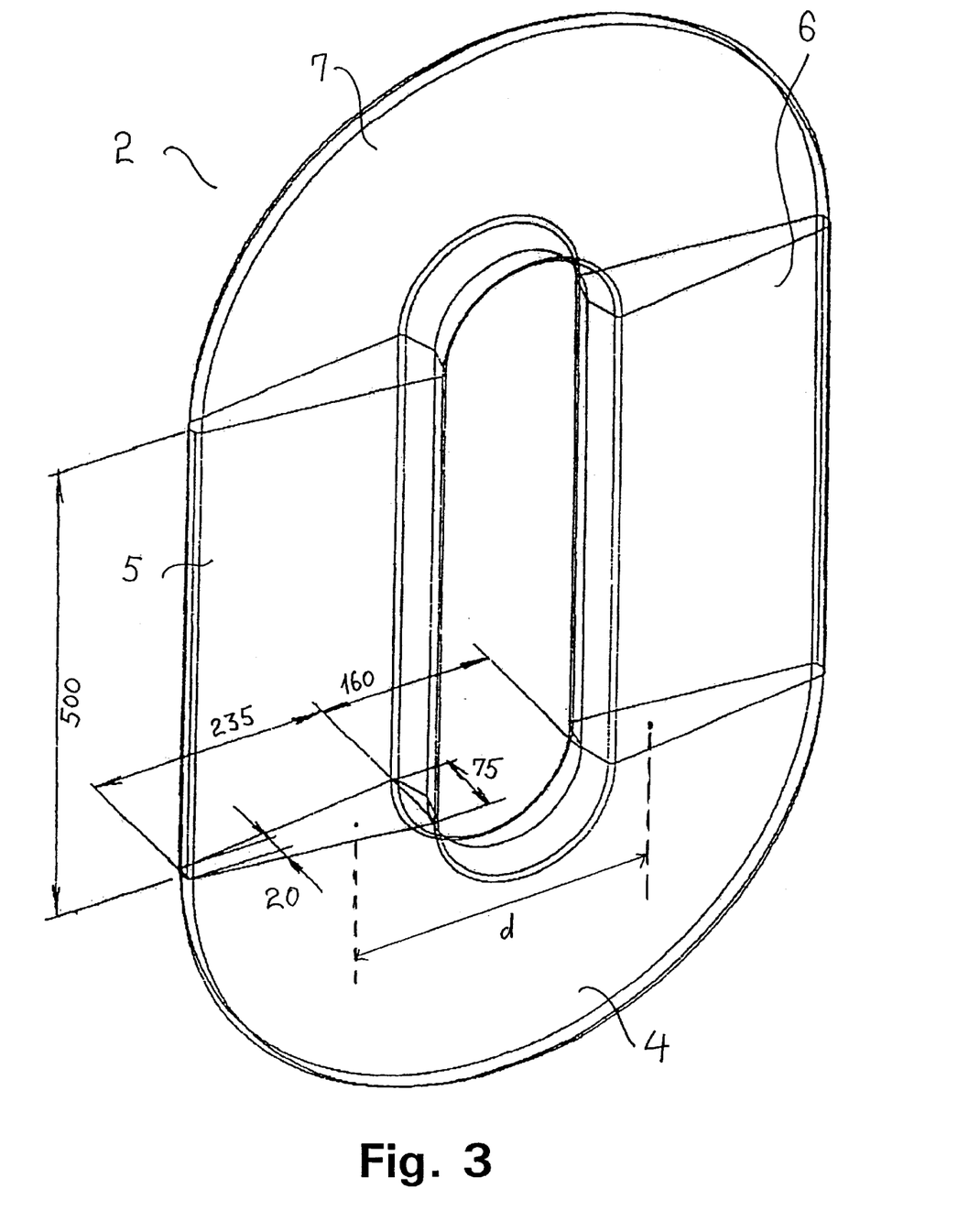
FIG. 3 shows a preferred embodiment of a U-shaped damper.
Figure 4:
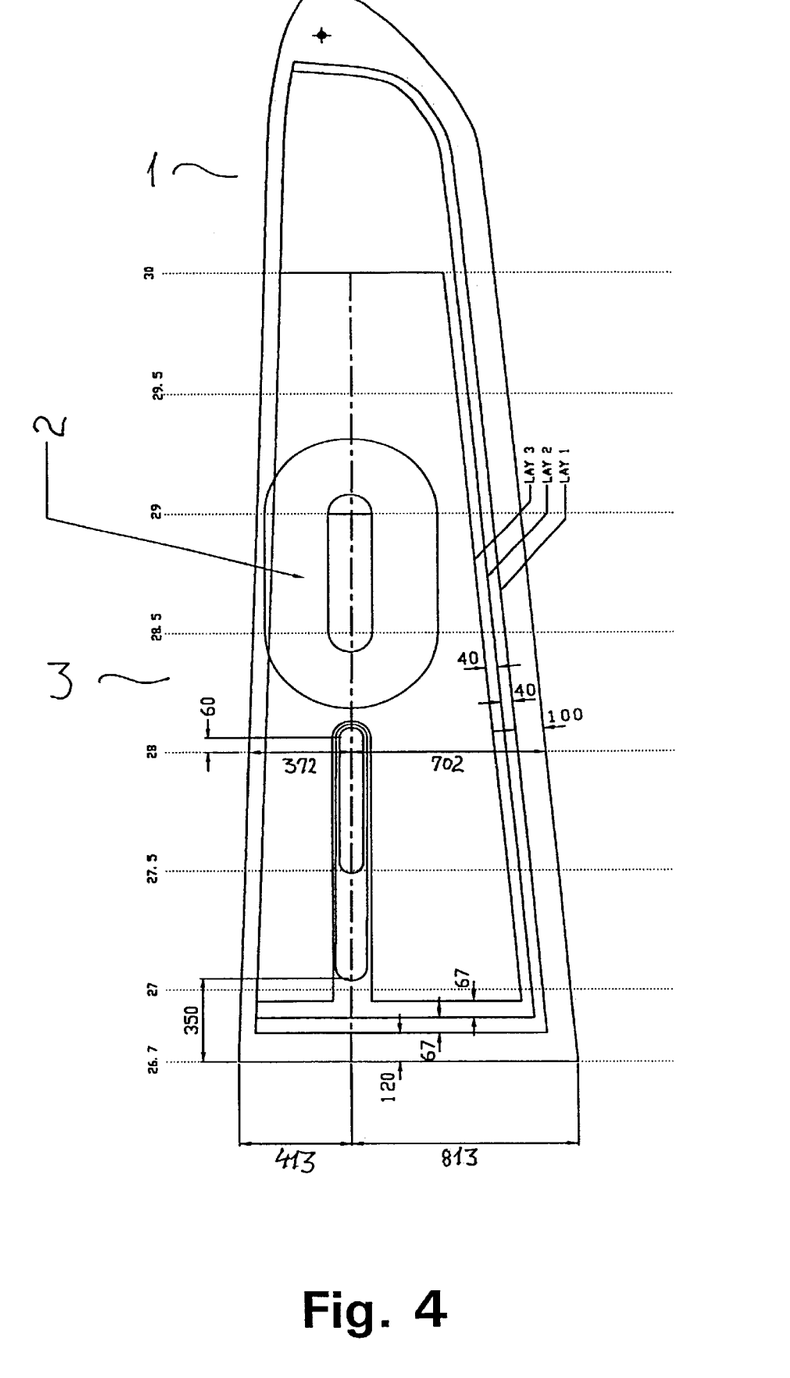
FIG. 4 shows the damper of FIG. 3 arranged in the tip of a blade.

The cross-sectional inner area of the damper employed (as shown in FIGS. 3 and 4) is A=0.0112 m² everywhere, the distance d between the centres of gravity of the two legs is 0.317 m and the density of the liquid, being water with 26 mass percentage of sodium chloride, is $\rho$=1200 kg/m³. The mass of the liquid being movable in the direction of the oscillations is M=A·d·$\rho$=4.2 kg. The equivalent mass $M_E$ of the blade for the first natural oscillating mode is found to be 514.9 kg at the tip. The deflection due to oscillations of the first natural mode at R is 0.864 times the deflection at the tip so the equivalent mass at R is $M_E$/0.864 and M is thus equivalent to 0.7% of the equivalent oscillating mass of the blade in the first natural mode at the radial position of the damper.

Figure 1:
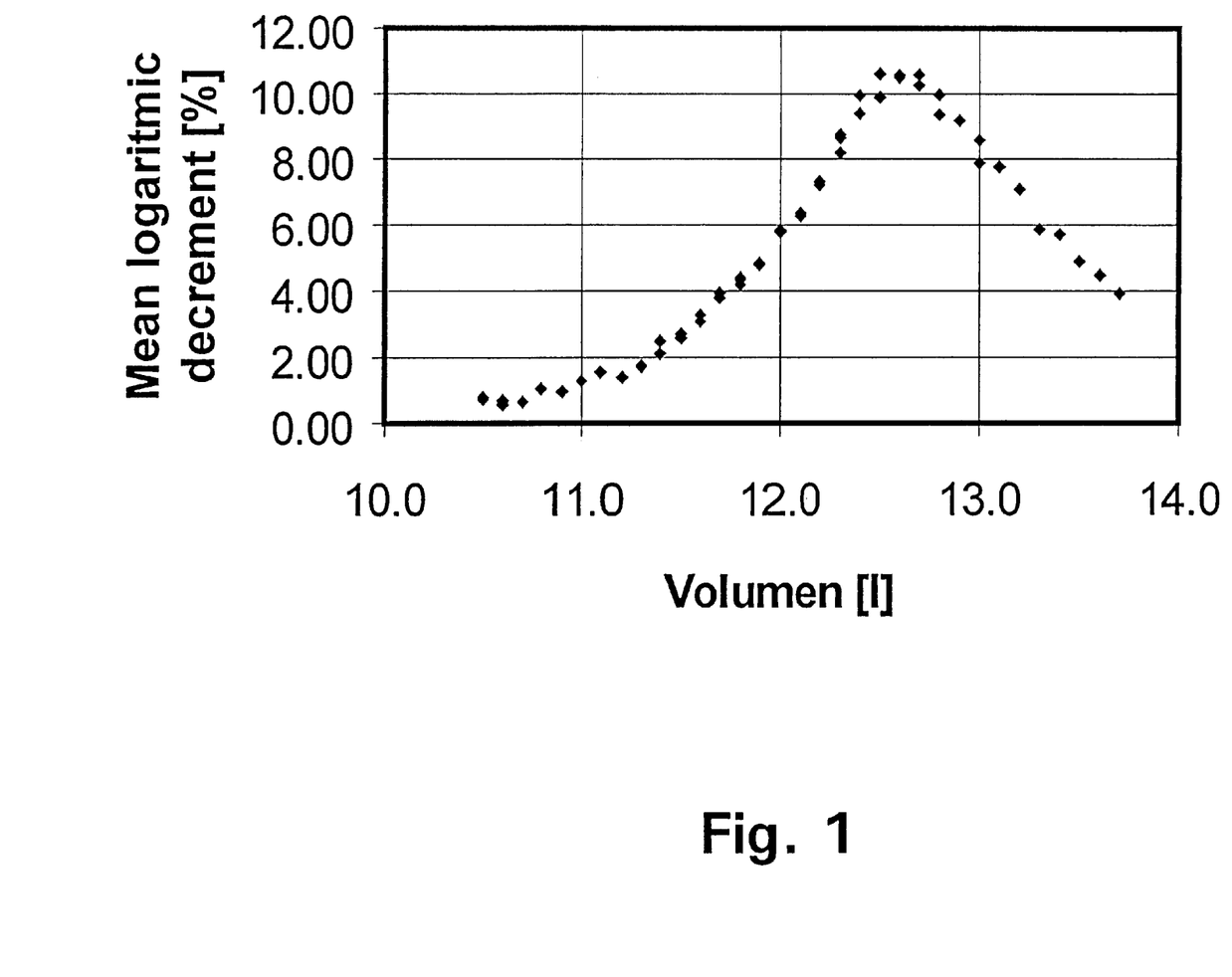
FIG. 1 is a graphical representation of the logarithmic decrement due to the presence of liquid in the U-shaped damper as a function of the volume of the liquid.

An experiment has been conducted with the damper employed with the blade in which the damper is mounted on a pendulum. The mass ratio of the blade was reproduced in the experiment and the logarithmic decrement of the amplitude of the pendulum and the damper without liquid as well as with different volumes of liquid was measured. The logarithmic decrement due to the presence of liquid in the damper is shown as a function of the volume of the liquid in FIG. 1.

The structural damping of the blade in the edgewise direction is 3.8% for which reason a satisfactory damping of the damper is taken to be 2.5% in order to reach a total damping of oscillations in the rotational plane of the rotor of at least 6.3%. The damping is found to be satisfactory when the volume is within a range corresponding to a frequency range of ±4.6% around an optimal volume of liquid providing an optimal damping of 10.5%. The optimal volume of liquid turned out to be larger than the theoretically predicted volume of liquid found from the above equation for the first natural frequency f of the damper.

This highly important result for design of this type of dampers shows that the optimal volume of liquid and thus the optimal length L of the liquid column inside the damper along the centre of gravity for the present damper is 1.117 times the volume, respectively the length L, found from the theoretical equation. Although this may vary with different design of a damper, a general conclusion is that an increase of the length of the liquid column in the range of 8–16%, probably of about 12% as compared to the theoretical value must be expected in order to reach the correct, optimal damping frequency of the damper.

Figure 2:
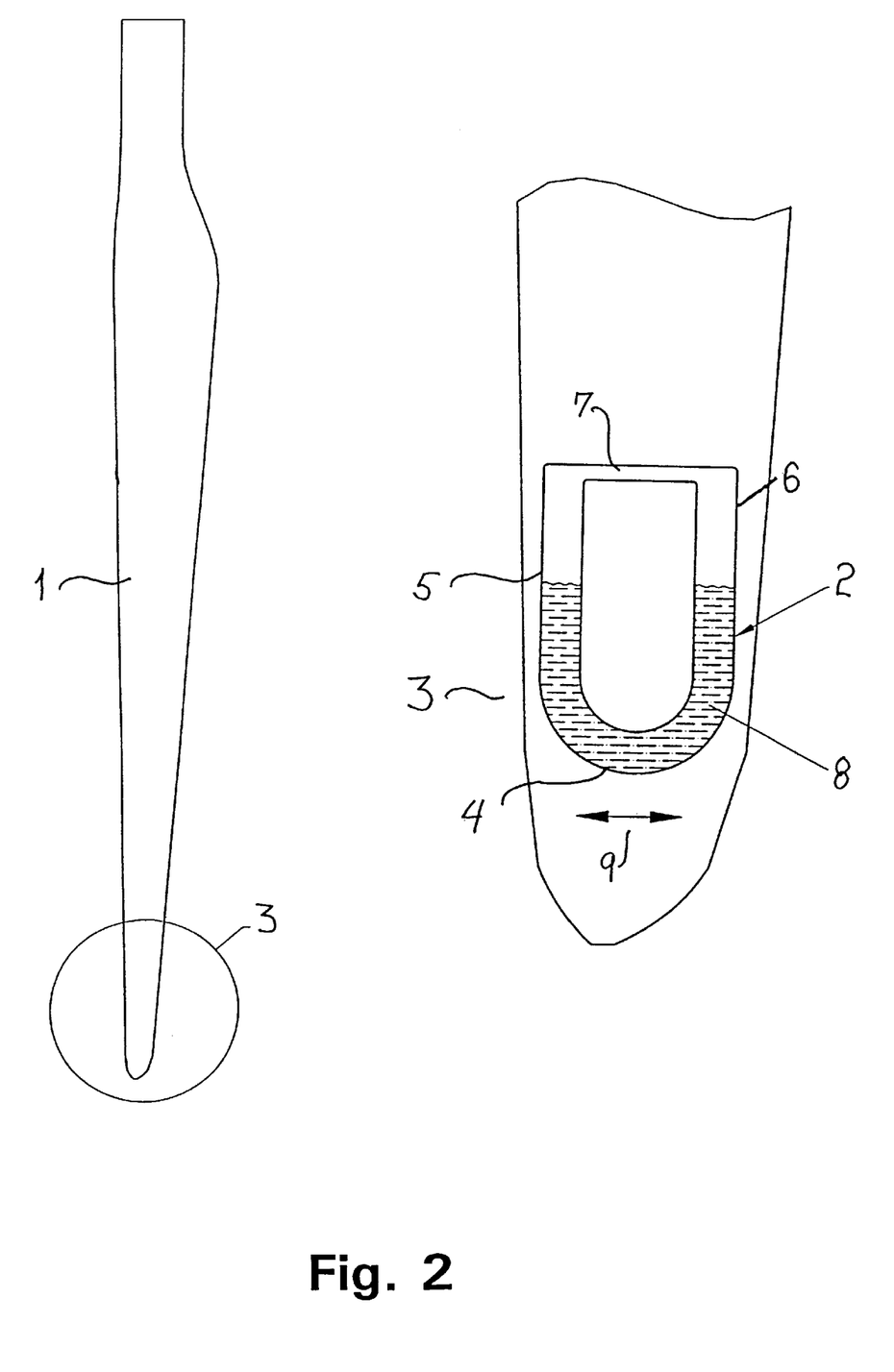
FIG. 2 shows a wind turbine blade having a U-shaped damper.

A wind turbine blade having a U-shaped damper 2 is shown in FIG. 2. The damper 2 is arranged in a tip end 3 of the blade 1 shown enlarged at the right part of FIG. 2. The damper 2 comprises a bottom part 4 of the U-shape, two arms 5, 6 arranged in the rotational plane of the rotor and a passage way 7 connecting the two arms 5, 6 at an upper end. An amount of liquid 8 is provided in the damper 2 and the amount of liquid being movable in the direction of the oscillations is indicated with an arrow 9.

FIG. 3 shows a preferred embodiment of a U-shaped damper 2 with dimensions given in millimeters. The damper is designed for the 32 meter long blade 1 given as an example previously. The inner cross-sectional area of the damper 2 is substantially constant in all of the damper 2, including the passage way 7. The distance d between the centres of gravity of the two legs 5, 6 is 317 millimeters and is also shown in the figure.

FIG. 4 shows the damper 2 of FIG. 3 arranged in the tip end 3 of a 32 meter long blade 1, the length of the blade 1 from the hub end is given in meters at the left part of the figure. The dimensions of the blade 1 are given in millimeters and the construction of the blade 1 with three layers is indicated as LAY 1, LAY 2 and LAY 3.

Figure 5:
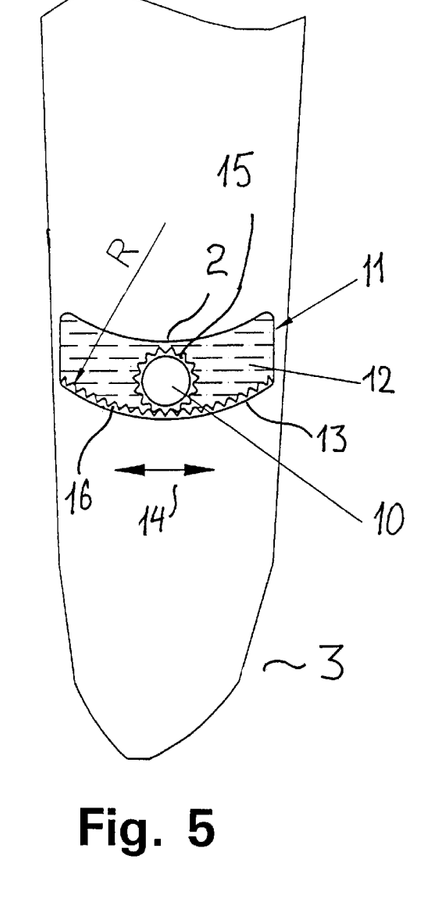
FIG. 5 shows a damper having a cylindrical element.

Another embodiment of the invention is shown in FIG. 5. A tip end 3 of a blade 1 is shown with a damper 2 having a cylindrical element 10 comprised within a box 11 that is filled with a liquid 12. The box 11 is arranged so that the curved side wall 13 on which the cylindrical element 10 rolls is positioned towards the tip end 3 of the blade 1 and so that the cylindrical element 10 may roll in the rotational plane of the rotor to which the blade 1 is connected so as to dampen oscillations in the rotational plane. The movement of the cylindrical element 10 is indicated with an arrow 14. The cylindrical element 10 comprises a toothed wheel 15 which engages with a toothed rim 16 of the curved side wall 13. The radius R of the curved side wall 13 must be less that the distance from the hub to the curved side wall 13 in order to achieve the correct damping effect of the damper 2.

Figure 6:
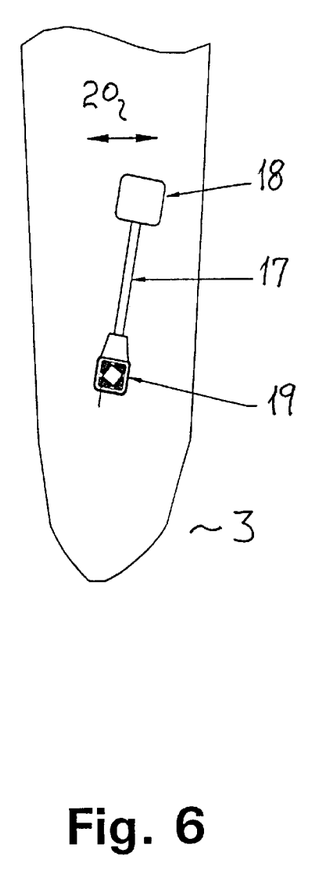
FIG. 6 shows a damper having a pendulum of which the mass element is closer to the tip end of the blade.
Figure 7:
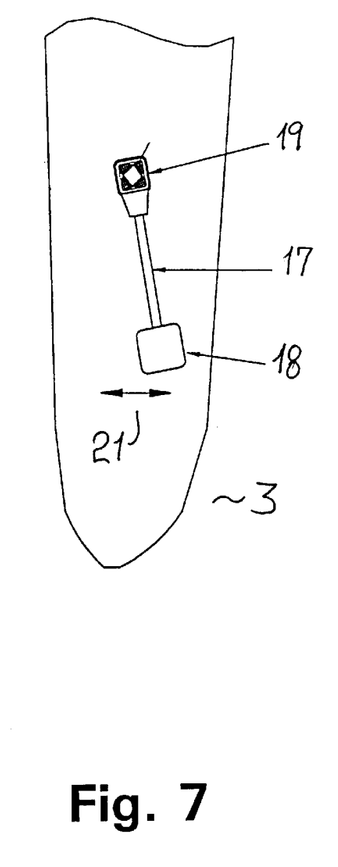
FIG. 7 shows a damper having a pendulum of which the mass element is closer to the hub end of the blade.

Two embodiments of dampers 2 comprising a pendulum 17 are shown in FIGS. 6 and 7 of which FIG. 6 shows a damper 2 having a pendulum 17 of which the mass element 18 is closer to the tip end 3 of the blade 1 than the pivot 19, and FIG. 7 shows a damper 2 having a pendulum 17 of which the mass element 18 is closer to the hub end of the blade 1 than the pivot 19. The pendulum 17 is suspended in a resilient material and may swing in the rotational plane of the rotor so as to dampen edgewise oscillations of the blade 1. The movement of the pendulum is indicated with arrows 20, 21.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wind turbine blade for being arranged on a rotor of a wind turbine, the blade comprising oscillation damping means defining a cavity having a U-shape within the blade, the cavity being partly filled with a liquid, of which cavity a bottom of the U-shape is arranged towards a tip end of the blade and arms of the U-shape are oriented substantially toward a hub end of the blade, wherein a passage way is defined at an upper end of the U-shaped cavity, the passage way connecting the two arms so that an O-shaped cavity is provided, said oscillation damping means being arranged in a tip end part of the blade.

2. The wind turbine blade according to claim 1, wherein the arms of the cavity are arranged in a rotational plane of the rotor and the position and design of the U-shaped cavity and a length of a liquid column inside the cavity are adjusted so that the oscillation damping means is tuned to dampen oscillations of the first natural frequency of the blade in the rotational plane.

3. The wind turbine according to claim 2, wherein the oscillation damping means is tuned to dampen oscillations of a frequency being within a range of 1–5 Hz.

4. The wind turbine blade according to claim 2, wherein the mass of the liquid inside the cavity and being movable in a direction of the oscillations is adjusted so that the oscillation damping means is tuned to dampen the oscillations of the first natural frequency of the blade in the rotational plane with a magnitude equivalent to a logarithmic decrement of the amplitude of at least 2%.

5. The wind turbine blade according to claim 4, wherein the mass of the liquid inside the cavity and being movable in the direction of the oscillations is adjusted so that the oscillation damping means is tuned to dampen the oscillations of the first natural frequency of the blade in the rotational plane with a magnitude equivalent to a logarithmic decrement of the amplitude of at least 5%.

6. The wind turbine blade according to claim 5, wherein the mass of the liquid inside the cavity and being movable in the direction of the oscillations is adjusted so that the oscillation damping means is tuned to dampen the oscillations of the first natural frequency of the blade in the rotational plane with a magnitude equivalent to a logarithmic decrement of the amplityde within a range of 6–15%.

7. The wind turbine blade according to claim 1, wherein the mass of the liquid being movable in a direction of oscillations is equivalent to 0.5% to 2% of the equivalent oscillating mass of the blade in the first natural oscillating mode at the radial position of the damping means.

8. The wind turbine blade according to claim 1, wherein an average cross-sectional area of the passage way is equal to at least half of the average cross-sectional area of the U-shaped cavity.

9. The wind turbine blade according to claim 8, wherein the average cross-sectional area of the passage way is substantially the same as the average cross-sectional area of the U-shaped cavity.

10. The wind turbine blade according to claim 1, wherein the freezing temperature of the liquid is below −10 degrees Celsius.

11. The wind turbine blade according to claim 10, wherein the liquid is water having at least one agent for lowering the freezing temperature of water.

12. A wind turbine blade according to claim 11, wherein the at least one agent is sodium chloride.

13. The wind turbine blade according to claim 12, wherein the liquid is water having at least 18 mass percentage of sodium chloride.

14. The wind turbine blade according to claim 12, wherein the liquid is water having at least 22 mass percentage of sodium chloride.

15. The wind turbine blade according to claim 12, wherein the liquid is water having at least 26 mass percentage of sodium chloride.

16. The wind turbine blade according to claim 11, wherein at least one agent is glycerol.

17. The wind turbine blade according to claim 1, wherein the density of the liquid is at least 1.1 metric ton per cubic meter.

18. The wind turbine blade according to claim 17, wherein the liquid is water having at least one agent for increasing the density of the liquid.

19. The wind turbine blade according to claim 18, wherein the at least one agent is sodium chloride.

20. The wind turbine blade according to claim 1, wherein the arms of the cavity are arranged in a rotational plane of the rotor and the oscillation damping means is tuned to dampen oscillations of a second natural frequency of the blade in the rotational phase.

21. The wind turbine blade according to claim 20, wherein the oscillation damping means are tuned to dampen oscillations of a frequency being within a range of 5–12 Hz.

22. The wind turbine blade according to claim 20, wherein the mass of the liquid inside the cavity and being movable in the direction of the oscillations is adjusted so that the oscillation damping means is tuned to dampen the oscillations of the second natural frequency of the blade in the rotational plane with a magnitude equivalent to a logarithmic decrement of an amplitude of at least 2%.

23. The wind turbine blade according to claim 22, wherein the mass of the liquid inside the cavity and being movable in the direction of the oscillations is adjusted so that the oscillation damping means is tuned to dampen oscillations of the second natural frequency of the blade in the rotational plane with a magnitude equivalent to a logarithmic decrement of an amplitude of at least 5%.

24. The wind turbine blade according to claim 23, wherein the mass of the liquid inside the cavity and being movable in the direction of the oscillations is adjusted so that the oscillation damping means is tuned to dampen the oscillations of the second natural frequency of the blade in a rotational plane with a magnitude equivalent to a logarithmic decrement of the amplitude within the range of 6–15%.

25. The wind turbine blade according to claim 20, a wherein the mass of the liquid being movable in the direction of the oscillators is equivalent to 0.5% to 2% of the equivalent oscillating mass of the blade in the second natural oscillating mode at the radial position of the damping means.

26. The wind turbine blade according to claim 1, wherein the freezing temperature of the liquid is below −18 degrees Celsius.

27. The wind turbine blade according to claim 1, wherein the density of the liquid is at least 1.15 metric ton per cubic meter.

28. The wind turbine blade according to claim 1, wherein the cavity is the only cavity in the blade partially filled with a liquid for the oscillation damping means.

29. A wind turbine blade for being arranged on a rotor of a wind turbine, the blade comprising oscillation damping means having a box and a cylindrical element that engages with one side wall of the box, said side wall being arranged towards a tip end of the blade and curving towards a hub end of the blade so that the cylindrical element is rollable from one side to another side of said wall about a neutral position.

30. The wind turbine blade according to claim 29, wherein the cylindrical element is rollable in a rotational plane of the rotor and the oscillation damping means is tuned to dampen oscillations of the first natural frequency of the blade in the rotational plane.

31. The wind turbine blade according to claim 29, wherein the box is at least partly filled with a liquid.

32. The wind turbine blade according to claim 29, wherein the cylindrical element and the side wall comprise mutually engaging elements so as to ensure that a periphery of the cylindrical element does not slip on the side wall when the element rolls.

33. The wind turbine according to claim 32, wherein the oscillation damping means includes a pendulum with a mass element which is swingable about a pivot axis.

34. The wind turbine according to claim 33, wherein the mass element is arranged closer to the tip end of the blade than to the pivot axis.

35. The wind turbine according to claim 33, wherein the mass element is arranged closer to the hub end of the blade than the pivot axis.

36. The wind turbine according to claim 33, wherein the pendulum is connected to the blade at the pivot axis with a resilient material so that energy is absorbed in the material when the pendulum swings, the resilient material being rubber.

37. The wind turbine according to claim 33, wherein the mass element comprises a wheel member for engaging with side wall parts of a cavity defined within the blade so as to support the mass element in a direction of the pivot axis, the wheel member being arranged about an axis being perpendicular to the pivot axis.

38. A wind turbine blade for being arranged on a rotor of a wind turbine, the blade comprising oscillation damping means having a pendulum with a mass element which is swingable about a pivot axis, the pendulum being connected to the blade at the pivot axis with a resilient material so that energy is absorbed in the material when the pendulum swings.

39. The wind turbine blade according to claim 38, wherein the pendulum is swingable in a rotational plane of the rotor and oscillation damping means is tuned to dampen oscillations of a first natural frequency of the blade in the rotational plane.

40. The wind turbine blade according to claim 38, wherein the mass element is arranged closer to a tip end of the blade than the pivot axis.

41. The wind turbine blade according to claim 38, wherein the mass element is arranged closer to a hub end of the blade than the pivot axis.

42. The wind turbine blade according to claim 38, wherein the resilient material comprises rubber.

43. The wind turbine blade according to claim 38, wherein the mass element comprises a wheel member for engaging with side wall parts of a cavity defined within the blade so as to support the mass element in the direction of the pivot axis, the wheel member being arranged about an axis being perpendicular to the pivot axis.

44. A wind turbine blade for being arranged on a rotor of a wind turbine, the blade comprising oscillation damping means for damping a second natural frequency defining a cavity having a U-shape within the blade, the cavity being partly filled with a liquid, of which cavity a bottom of the U-shape is arranged towards a tip end of the blades and arms of the U-shape are oriented substantially toward a hub end of the blade, wherein a passage way is defined at an upper end of the U-shaped cavity, the passage way connecting the two arms so that an O-shaped cavity is provided, said oscillation dampening means being arranged in a region between the hub and a nodal point of the second natural frequency along wind turbine blade.

45. The wind turbine blade according to claim 44, wherein an average cross-sectional area of the passage way is equal to at least half of the average cross-sectional area of the U-shaped cavity.

46. The wind turbine blade according to claim 45, wherein the average cross-sectional area of the passage way is substantially the same as the average cross-sectional area of the U-shaped cavity.

47. The wind turbine blade according to claim 44, wherein the freezing temperature of the liquid is below −10 degrees Celsius.

48. The wind turbine blade according to claim 47, wherein the liquid is water having at least one agent for lowering the freezing temperature of water.

49. A wind turbine blade according to claim 48, wherein the at least one agent is sodium chloride.

50. The wind turbine blade according to claim 49, wherein the liquid is water having at least 18 mass percentage of sodium chloride.

51. The wind turbine blade according to claim 49, wherein the liquid is water having at least 22 mass percentage of sodium chloride.

52. The wind turbine blade according to claim 49, wherein the liquid is water having at least 26 mass percentage of sodium chloride.

53. The wind turbine blade according to claim 48, wherein at least one agent is glycerol.

54. The wind turbine blade according to claim 44, wherein the density of the liquid is at least 1.1 metric ton per cubic meter.

55. The wind turbine blade according to claim 54, wherein the liquid is water having at least one agent for increasing the density of the liquid.

56. The wind turbine blade according to claim 55, wherein the at least one agent is sodium chloride.

57. The wind turbine blade according to claim 44, wherein the arms of the cavity are arranged in a rotational plane of the rotor and the oscillation damping means is tuned to dampen oscillations of a second natural frequency of the blade in the rotational phase.

58. The wind turbine blade according to claim 57, wherein the oscillation damping means are tuned to dampen oscillations of a frequency being within a range of 5–12 Hz.

59. The wind turbine blade according to claim 57, wherein the mass of the liquid inside the cavity and being movable in the direction of the oscillations is adjusted so that the oscillation damping means is tuned to dampen the oscillations of the second natural frequency of the blade in the rotational plane with a magnitude equivalent to a logarithmic decrement of an amplitude of at least 2%.

60. The wind turbine blade according to claim 59, wherein the mass of the liquid inside the cavity and being movable in the direction of the oscillations is adjusted so that the oscillation damping means is tuned to dampen oscillations of the second natural frequency of the blade in the rotational plane with a magnitude equivalent to a logarithmic decrement of an amplitude of at least 5%.

61. The wind turbine blade according to claim 60, wherein the mass of the liquid inside the cavity and being movable in the direction of the oscillations is adjusted so that the oscillation damping means is tuned to dampen the oscillations of the second natural frequency of the blade in a rotational plane with a magnitude equivalent to a logarithmic decrement of the amplitude within the range of 6–15%.

62. The wind turbine blade according to claim 57, wherein the mass of the liquid being movable in the direction of the oscillators is equivalent to 0.5% to 2% of the equivalent oscillating mass of the blade in the second natural oscillating mode at the radial position of the damping means.

63. The wind turbine blade according to claim 44, wherein the freezing temperature of the liquid is below −18 degrees Celsius.

64. The wind turbine blade according to claim 44, wherein the density of the liquid is at least 1.15 metric ton per cubic meter.

* * * * *